United States Patent [19]

Le Pape

[11] 4,049,376
[45] Sept. 20, 1977

[54] DYED COPOLYESTERS AND METHOD OF MAKING

[75] Inventor: Alain Yves Le Pape, Rouen, France

[73] Assignee: Produits Chimiques Ugine Kuhlmann, Paris, France

[21] Appl. No.: 729,749

[22] Filed: Oct. 6, 1976

[30] Foreign Application Priority Data
Oct. 23, 1975   France ................ 75.32448

[51] Int. Cl.$^2$ .................. D06P 3/52; D06L 67/02
[52] U.S. Cl. ...................... 8/162 R; 8/1 B; 8/1 D; 8/168 C; 8/179; 8/DIG. 4; 8/DIG. 7; 260/40 R
[58] Field of Search .............. 8/162 R, 179, 168 C, 8/DIG. 7, 1 B, 1 D; 260/40 R

[56] References Cited
U.S. PATENT DOCUMENTS

| | | | |
|---|---|---|---|
| 3,371,092 | 2/1968 | Dien | 260/281 |
| 3,480,625 | 11/1969 | Ronco et al. | 260/246 |
| 3,510,242 | 5/1970 | Bryan | 8/25 |
| 3,579,519 | 5/1971 | Schweizer | 260/279 |
| 4,016,132 | 4/1977 | Lees | 260/40 R |

FOREIGN PATENT DOCUMENTS

| | | | |
|---|---|---|---|
| 7,003,619 | 9/1970 | Netherlands | 260/40 R |
| 1,045,565 | 10/1966 | United Kingdom | 260/40 R |
| 1,111,895 | 5/1968 | United Kingdom | 260/40 R |
| 1,198,501 | 7/1970 | United Kingdom | 260/40 R |

Primary Examiner—John Kight, III
Attorney, Agent, or Firm—Beveridge, DeGrandi, Kline & Lunsford

[57] ABSTRACT

New dyed copolyesters and their preparation are disclosed.

The copolyesters are characterized in that their macromolecular chains include dye moieties chosen from among those of the formulae:

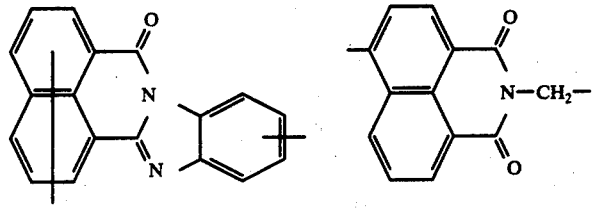
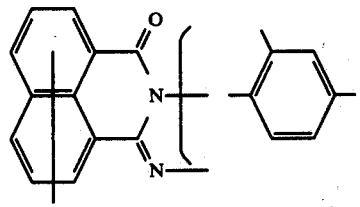
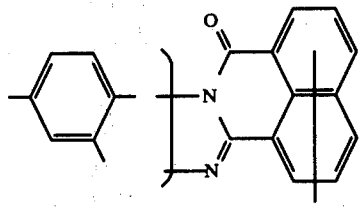
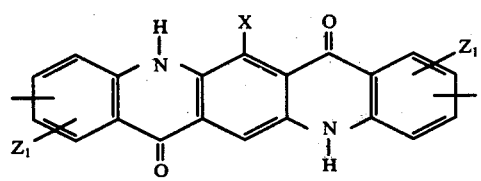
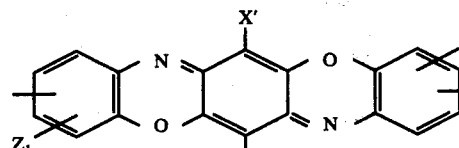
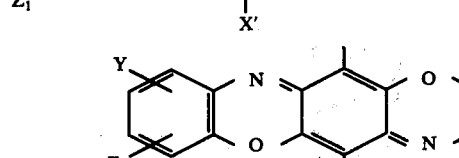

in which X is a hydrogen atom or a hydroxy group; X' is a halogen atom; Y is an alkoxy residue, $Z_1$ is a hydrogen atom or a halogen atom or an alkyl or alkoxy residue and $Z_2$ is a hydrogen atom or an acylamino residue.

These copolyesters can be converted into textile fibers or be used for dyeing of bulk plastic materials and synthetic fibers.

4 Claims, No Drawings

DYED COPOLYESTERS AND METHOD OF MAKING

The present invention relates to the manufacture of dyed polyesters.

Processes are known for dyeing polyesters in bulk, or in mass, by means of dyes or pigments of high thermal stability which are dispersed or dissolved in the molten polyester. Since polyesters generally have a high melting point, few organic dyestuffs have sufficient thermal stability for their use in this field to be considered.

Processes are also known for the preparation of copolycondensates of the polyamide and polyurethane type and acrylic copolymers wherein the dye is a part of the structure, i.e., polymers containing the dye moiety in the macromolecular chain. Products of this kind are described in French Pat. No. 2,117,465 and in the French patent application Nos. 7,323,855 of June 29, 1973, 7,426,846 and 7,426,847 of Aug. 2, 1974 filed by the present applicant.

It has been shown that similar products can also be prepared in the field of polyesters. It has in fact been proposed to prepare copolyesters in the presence of dyestuffs wherein the dyestuffs participate in the polycondensation reaction. In particular, dyestuffs of the anthraquinone class (Japanese patent applications Nos. 13384/72 and 13385/72), dimethylviolanthrone-3,12-dicarboxylate (Brit. Pat. No. 838,716), dyestuffs of the perylene series (French Pat. No. 1,570,579 and Japanese application No. 27261/71) and phthalocyanine dyestuffs (French Pat. Nos. 1,546,056; 1,546,057 and 1,570,577) have been mentioned in this regard.

However, it has been found that:

1. the anthraquinone dyestuffs used in the earlier processes do not in general have sufficient thermal stability to permit commercial development of this method;
2. the violanthrone, perylene or phthalocyanine dyestuffs for various reasons (too low solubility in the medium in which the polyesters are produced, side reactions producing grafting or reticulation etc.) do not yield copolyesters with a high concentration of dyestuffs; and
3. these latter dyestuffs do not afford a wide variety of tints.

It is therefore an object of this invention to provide dyed copolyesters and method of making same wherein the dyestuffs have adequate thermal stability and wherein the copolyesters may be produced with a high concentration of dyestuffs as well as a range of tints. The dyestuff moiety becomes a part of the macromolecular structure of the polyester.

It has now been found that this result is achieved by the use of dyestuffs of the following general formula

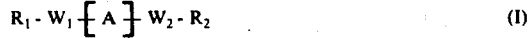   (I)

where $R_1$ and $R_2$ may be different or, preferably, the same and each represents a hydroxy, carboxy or carbalkoxy group, $W_1$ and $W_2$ may be different or, preferably, the same and each represents a direct link or a hydrocarbon chain capable of carrying an atom of oxygen, sulphur or nitrogen, and A represents a dyestuff moiety selected from among those of the following formulae:

(II)

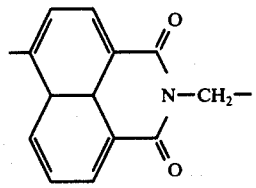

(III)

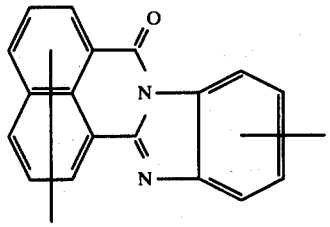

(IV)

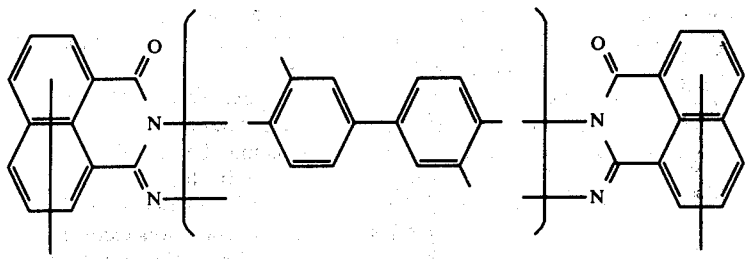

(V)

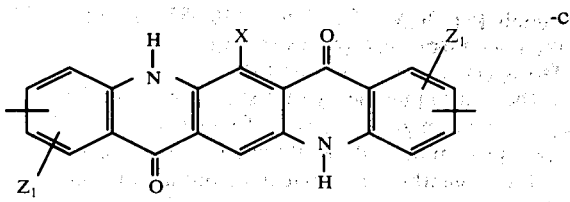

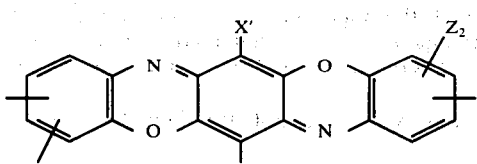

(VI)

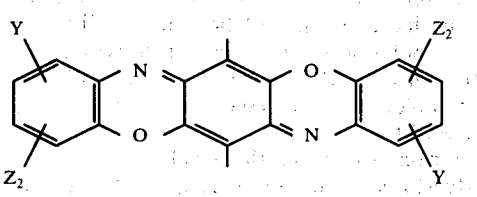

(VII)

where X is an atom of hydrogen or a hydroxy group, X' is a halogen atom, Y is an alkoxy residue, $Z_1$ is a hydrogen atom or a halogen atom or an alkyl residue or an alkoxy residue, and $Z_2$ is a hydrogen atom or an acylamino residue.

In formula I, the carbalkoxy groups represented by $R_1$ and $R_2$ generally contain 2 to 5, preferably 2 or 3 carbon atoms. The halogen atom represented by the symbols X' and $Z_1$ are preferably chlorine or bromine. The alkyl and alkoxy groups indicated by the symbol $Z_1$ may contain 1 to 4, perferably 1 or 2 carbon atoms e.g., methyl, ethyl, methoxy, ethoxy. The acyl groups of the acylamino residue represented by $Z_2$ is the residue of an carboxylic aliphatic acid containing 2 to 5 carbon atoms, for example, acetyl. The acyl group may also be the residue of an aromatic carboxylic acid; e.g. benzoyl.

The subject of the present invention is therefore dyed copolyesters characterized in that their macromolecular chains include recurring dyestuff moieties corresponding to the formulae (II), (III), (IV), (V), (VI) and (VII) above.

These copolyesters can be prepared by copolymerizing one or more of the dyestuffs of formula (I) with the essential starting material for the preparation of the polyesters; e.g. a polycarboxylic acid and a polyhydric alcohol or polyol.

Particularly preferred polyesters are polyethylene glycol terephthalate, of which the starting compounds are an aromatic dicarboxylic acid, viz. terephthalic acid, and a diol, viz. ethylene glycol. It is also contemplated that a polyester may be used wherein the starting components are selected, for the one part, from the aromatic or aliphatic oxyacids or dicarboxylic acids such as β-hydroxyethoxybenzoic acids, p-hydroxybenzoic acid, isophthalic acid, 4,4'-diphenyldicarboxylic acid, 4,4'-diphenylether-dicarboxylic acid, 4,4'-diphenoxy-ethane-dicarboxylic acid, adipic acid, or sebacic acid, and for the other part from aliphatic diols, alicyclic diols or aromatic diols, such as trimethylene glycol, tetramethylene glycol, hexamethylene glycol, propylene glycol, cyclohexane 1,4-diol, cyclohexane 1,4-dimethanol bis-1,4(β-hydroxy-ethoxy) benzene, bis-2,2(4-hydroxy phenyl) propane or the poly(oxy-ethylene) glycols. These polyesters, which are suitable for the spinning of textile fibers and the methods of forming them including starting materials, reaction conditions and the like are well known in the art.

All the known methods for the preparation of polyesters may be employed for the preparation of the copolyesters according to the invention; it is sufficient to add one or more of the dyestuffs of formula (I) to the starting materials of the polyester.

In the case of polyethylene glycol terephthalate it is usual to carry out a transesterification between dimethyl terephthalate and ethylene glycol by heating in the presence of a catalyst to give bis-(β-hydroxyethyl) terephthalate which then polycondenses with itself at high temperature under reduced pressure.

To obtain the copolyesters according to the invention it is sufficient, whatever method of preparation of the polyesters is used, to carry out the transesterification on the ester groups or the esterification of the alcohol or acid groups of the dyestuffs of formula (I) before the synthesis of the polyester.

The quantity of dyestuffs of formula (I) may vary within very wide limits according to the intensity of color required. The invention is not limited to addition of only one dyestuff of formula (I). On the contrary, the use of two or more dyestuffs of formula (I) makes it possible, by varying the quantities and proportion of the dyestuffs to obtain copolyesters of all hues with different color intensities.

Instead of using a dyestuff of formula (I), a copolyester colored in accordance with the invention with a relatively high concentration of dyestuff may be used for incorporation into the polymerization reaction. By polycondensation it then forms a dyed copolyester according to the invention with a lower concentration of dye.

In any event sufficient dyestuff is incorporated into the copolyester to yield the intended intensity of color. This may be established by simple experimentation as is known in the art.

The inclusion of the dyestuffs in the macromolecular chains is demonstrated by the following facts:

a. When the copolyester is dissolved in a solvent which does not dissolve the dyestuff, the latter passes integrally into solution at the same time as the polyester, which is not the case when the dyestuff is not copolymerized with the polyester.

b. It is impossible to extract the dyestuff itself from the copolyester, even by means of very good solvents for the pure dyestuff. Under the same conditions a polyester colored in bulk by means of the same dyestuff is completely decolorized.

c. It is impossible to separate the dyestuff from the product obtained according to the invention by thin layer chromatography on silica. This is perfectly possible in the case of colored polyesters obtained by the classical method of coloring.

The copolyesters of the invention in general have a quite remarkable mutual solubility with the unmodified polyesters. The copolyesters of the invention, particularly those with a high concentration of dyestuff are therefore very suitable for coloring or dyeing of polyesters in the mass, but also other polymers (in particular polyamides, polyurethanes and polyolefins) which concern plastics or textile fibers.

The dyed copolyesters of the invention, in particular those with a low concentration of dyestuff can be transformed directly by spinning and drawing according to the known processes into fibers which can be used as such in the textile industry. These fibers have all the qualities (mechanical properties, plasticity, etc.) of the classic polyester fibers.

The use of dyed copolyesters of the invention, either for the mass dyeing of synthetic fibers or as a material for spinning, permits avoidance of the problems constantly met with in mass coloring with pigments. These problems manifest themselves most frequently by a blockage of the filters protecting the very fine orifices of the spinning heads or by frequent breakage of the filaments during the drawing operation, as well as by a considerable diminution of the mechanical properties. Moreover, the products obtained with the copolyesters of the invention have a remarkable transparency, which it is impossible to obtain by mass coloration with pigments.

The fastness of the colors obtained with the copolymers of the invention in tests standardized by the International Standards Organization (ISO) and the Groupement d'Etudes International Europeen (ECE) for textile articles, in particular fastness to light, washing, rubbing and normal dry cleaning solvents shows a substantial improvement in comparison with that of colors obtained with the same dyestuff (I) applied in bulk dyeing of polyester fibers.

The dyestuffs of formula (I), some of which are already known, may be prepared according to known processes, appropriate for each of the classes of dyestuffs (naphthalimides, naphthoylenebenzimidazoles, quinacridones, dioxazines).

Examples of dyestuffs of formula (I) include the following:

N-($\beta$-hydroxyethyl) 4-($\beta$-hydroxyethylamino) 1,8-naphthalimide.

N-($\beta$-hydroxyethyl) 4-($\beta$-hydroxyethoxy) 1,8-naphthalimide

- the dyestuffs of the formula

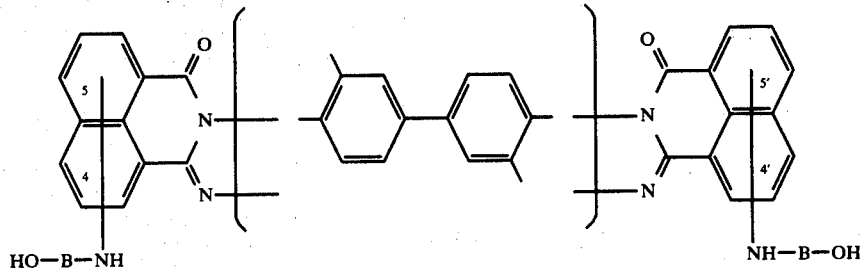

(VIII)

in which B is represents a straight of branched aliphatic chain, containing 1 to 4 carbon atoms and the residues -NH-B-OH are fixed in position 4,4' or 4,5' or 5,5';

the quinacridones of the formula:

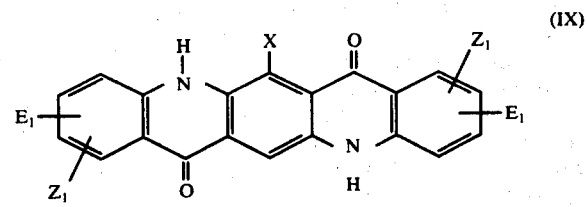

(IX)

in which X and $Z_1$ have the same meaning as previously and $E_1$ represents a hydroxyalkoxy residue containing 1 to 4, preferably 1 or 2, carbon atoms or a carbalkoxy residue containing 2 to 5, preferably 2 or 3, carbon atoms;

the dioxazines of the formula:

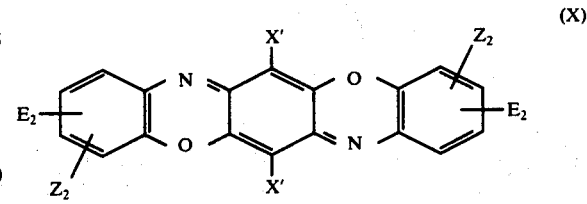

(X)

in which X' and $Z_2$ have the same meaning as above and $E_2$ represents a hydroxyalkoxy residue containing 1 to 4, preferably 1 or 2, carbon atoms:

the dioxazines of the formula:

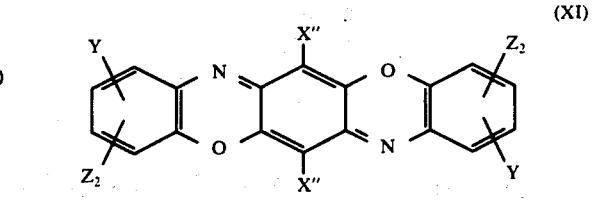

(XI)

in which X" represents a carbalkoxy residue containing 2 to 5 and preferably 2 or 3, carbon atoms and Y and $Z_2$ have the same meaning as above.

The dyestuffs of formula (VIII) may be prepared by condensation of a mole of 3,4,3',4'-tetra-amino diphenyl with at least two moles of 4-halogeno naphthalic anhydride and then treatment of the derivative thus obtained by an amino-alcohol $H_2N$—B—OH.

The dyestuffs of formula (IX) in which X is a hydrogen atom and $E_1$ is a hydroxyalkoxy residue, may be prepared by condensation of 2,5-dicarbomethoxy (or dicarbethoxy) cyclohexane 1,4-dione with an aniline of the formula:

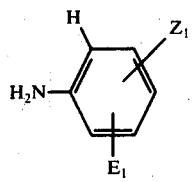

(XII)

followed by oxidation in a basic medium and finally cyclization in an acid medium.

The quinacridones of formula (IX) in which X is a hydrogen atom and $E_1$ is a carbalkoxy residue, may be prepared by condensation of 2,5-dicarbomethoxy (or dicarbethoxy) cyclohexane 1,4-dione with an aniline of formula XII, then cyclization by heating at high temperature (200°–260° C) in an inert solvent and finally oxidation in a neutral or an acid medium.

The quinacridones of formula (IX) in which X is a hydroxy group may be prepared by condensation of 2,5-dibromo 3,6-dicarbomethoxy (or dicarbethoxy) 1,4-benzoquinone with an aniline of formula (XII), followed by cyclization by heating at high temperature (200°–260° C) in an inert solvent, and then finally reduction to 60° C with copper in sulphuric acid.

The dioxazines of formula (X) may be prepared by condensation of a 2,3,5,6-tetra-halogeno 1,4-benzoquinone with an o-alkoxy aniline of the formula

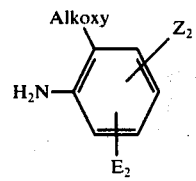

(XIII)

followed by cyclization of the composition thus obtained. The dioxazines of formula (XI) can be prepared by condensation of a 2,5-dicarbalkoxy 3,6-dihalogeno 1,4-benzoquinone with an o-alkoxy-aniline of the formula:

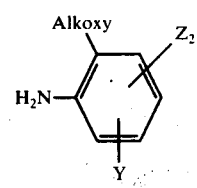

(XIV)

then cyclization of the composition thus obtained. The condensation of the benzoquinones with the o-alkoxy anilines of formulae (XIII) and (XIV) may be effected at ambient temperature in dimethylformamide. The cyclization of the condensation products is advantageously effected in the presence of benzoyl chloride in an inert solvent, such as o-dichloro-benzene, at refulux.

The following examples, in which parts are by weight unless otherwise stated, illustrate the invention without limiting it.

EXAMPLE 1

A mixture of 100 parts of dimethyl terephthalate, 100 parts of ethylene glycol, 5 parts of methanol and 0.04 parts of cadmium acetate is heated under a current of nitrogen. The methanol produced in the transesterification is distilled off as it is formed. The theoretical quantity (i.e. 46 parts) is recovered at the end of an hour. At this point the temperature rises to 220° C. Then 0.02 parts of tetrabutyl titanate $Ti(OC_4H_9)_4$ and 0.5 parts of N-(β-hydroxyethyl) 4-(β-hydroxyethylamino) 1,8-naphthalimide are added. Heating is then continued for 30 minutes at 230° to 240° C by means of a molten metal bath, under slightly reduced pressure to eliminate excess ethylene glycol. The pressure is then reduced over a period of 30 minutes to 16 mm Hg and the temperature is raised to 275° C. The pressure is then reduced again to 0.05 mm Hg and the polycondensation is allowed to proceed for 90 minutes.

In this way a copolyester is obtained with an intrinsic viscosity, measured at 25° C in o-chlorophenol of 0.6 100 $cm^3g^{-1}$ and which melts at 255° C (m.p. determined by differential thermal analysis). By way of comparison, polyethylene glycol terephthalate obtained in the same way but in the absence of the dye N-(β-hydroxyethyl) 4-(β-hydroxyethylamino) 1,8-naphthalimide (white polyester) melts at 254° C and has an intrinsic viscosity of 0.58 100 $cm^3g^{-1}$.

A strand of the above copolymer is spun in the molten state, drawn to 5 times its length and heated to 150° C for 40 minutes. Copolyester fibers are obtained of greenish yellow color and strongly fluorescent, showing an excellent resistance to solvents, washing, sublimation, mechanical wear and light.

When the above copolyester is kept in the molten state at 280° C with stirring and under an atmosphere of nitrogen for 5 hours, no change can be detected in the hue, so excellent is its thermal stability.

The incorporation of the dyestuff into the chains of the polyester by chemical bonding is shown by the two following experiments conducted on a solution of the above copolyester in o-chlorophenol:

a. The copolyester is precipitated by the addition of ethanol and the whole of the dye is found in the copolyester precipitate. The filtrate is colorless, although the o-chlorophenol/ethanol mixture is an excellent solvent for the pure dyestuff.

b. It is impossible to separate the dyestuff from the copolyester by thin layer chromatography on silica with chloroform as the eluant.

The same experiments carried out on a polyester dyed in bulk by the same dyestuff led respectively to a distinctly colored filtrate and a spot of dyestuff separated from the polyester.

The dyestuff used in this example can be prepared by heating 4-bromo naphthalic anhydride in 2-amino ethanol at 160°–170° C, filtering at 0° C and recrystallizing from ethanol.

EXAMPLE 2

The process is carried out as in example 1, but with 10 parts of N-(β-hydroxyethyl) 4-(β-hydroxyethylamino) 1,8 naphthalimide instead of 0.5 parts. A copolyester with a high concentration of dyestuff is obtained. It melts at 232° C and its intrinsic viscosity, measured as in example 1, is 0.37 100 cm³g⁻¹.

EXAMPLE 3

The process is carried out as in example 1, but replacing the dye N-(β-hydroxyethyl) 4-(β-hydroxyethylamino) 1,8-naphthalimide by 5 parts of dyed copolyester described in example 2. A copolyester is obtained which melts at 258° C and of which the intrinsic viscosity, measured as in example 1, is 0.65 100 cm³g⁻¹. Its hue and its properties are identical with those of the copolyester of example 1.

EXAMPLE 4

100 parts of "white polyester" defined in the second paragraph of example 1 are mixed in the molten state with 5 parts of the dyed copolyester described in example 2. The molten mixture is then spun into a strand which is drawn to 5 times its length and heated at 150° C for 40 minutes. The fibers thus obtained have identical color and properties to those of fibers prepared according to the third paragraph of example 1.

EXAMPLE 5

The process is carried out as in example 1, but with replacement of the N-(β-hydroxyethyl) 4-(β-hydroxyethlamino) 1,8-naphthalimide by 0.5 parts of the dye of formula

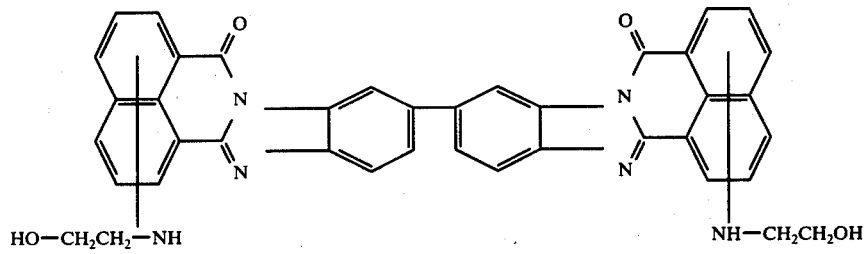

(XV)

A golden yellow copolyester is obtained which melts at 254° C and of which the intrinsic viscosity, measured as in example 1, is 0.58 100 cm³g⁻¹. The incorporation of the dyestuff in the macromolecular chains is demonstrated in the same way as in example 1.

The colorant of formula (XV) can be prepared in the following manner: in a vehicle equipped with an agitator and a reflux column, there are introduced 21.8 parts of 3,4,3',4' tetra-amino-diphenyl, 61 parts of 4-bromo naphthalic anhydride and 500 parts by volume of glacial acetic acid. The mixture is heated at reflux for 4 hours. There is formed a very copious brick-red precipitate which is filtered and washed in boiling water until neutrality. After drying and grinding, a golden-yellow powder is obtained. 20 parts of this powder are mixed with 200 parts by volume of 2-amino ethanol and are heated at 160°-170° C for 4 hours. The mixture is then cooled to 50° C, the precipitate filtered, then repeatedly washed in boiling ethanol and then dried at 110° C for 5 hours. A brick-red powder is obtained which melts above 350° C.

EXAMPLE 6

The process is carried out as in example 1, but using as the dyestuff 0.5 parts of bis-2,9(hydroxymethoxy) quinacridone. A copolyester is obtained with a violet-red color, melting at 252° C and with an intrinsic viscosity, measured as in example 1, of 0.53 100 cm³g⁻¹.

If this copolyester is dissolved in o-chlorophenol, a violet-mauve homogeneous solution is obtained. No precipitate of dyestuff appears after 24 hours standing. Bis-2,9(hydroxymethoxy) quinacridone being completely insoluble in o-chlorophenol, these results show that it is incorporated in the macromolecular chains.

The same experiment performed with a polymer obtained under the same conditions, but with a non-substituted quinacridone, gave a colorless solution in o-chlorophenol; all the dyestuff was precipitated to the bottom of the solution. An identical result was obtained with a white polyester dyed in the spinning mass with bis-2,9(hydroxymethoxy) quinacridone.

The bis-2,9(hydroxymethoxy) quinacridone employed in this example can be prepared in the following manner: In a sphere of 2000 parts of capacity by volume there are introduced 1000 parts by volume of ethanol; 25.6 parts of 2,5-dicarbethoxy 1,4-cyclohexanedione; 38.7 parts of 4-hydroxymethoxy aniline; and 5 parts by volume of chlorohydric acid, 12 N. The mixture is heated at 70°-78° C in a nitrogen atmosphere for 3 hours. Yellow needles crystallize slowly. It is then filtered at 40°-45° C and washed with ethanol.

The product thus obtained is dissolved in 500 parts by volume of ethanol, a solution of 30 parts of sodium hydroxide in 250 parts of water is added, then 50 parts of m-nitrobenzene sodium sulfonate. The mixture is heated at reflux during 4 hours, then poured into 1000 parts of cold water. The solution becomes clear. It is then acidified until pH 2 by the addition of chlorohydric acid, the violet precipitate is filtered, it is washed in water until it reaches the neutral level and then is dried. 10 parts of bis-2,5(4-hydroxymethoxy phenylamino) benzene 1,4-dicarboxylic acid thus obtained is dissolved in 100 parts of polyphosphoric acid at 70° C, then it is heated at 100°-120° C for 2 hours and then left to cool until the temperature reaches 90° C. The polyphosphoric acid is subsequently hydrolyzed by adding 200 parts of water a little at a time, the precipitate is filtered, washed in water until the neutral point, and then in acetone. The bis-2,9(hydroxymethoxy) quinacridone thus obtained is dried at 100° C for 5 hours.

The following table shows the characteristics of other copolyesters of the invention obtained by the process of example 1, but with replacement of the N-(β-hydroxyethyl) 4-(β-hydroxyethyl-amino) 1,8-naphthalimide by 0.5 parts of the dyestuff shown in the second column of the table. The intrinsic viscosities (expressed in 100 cm³g⁻¹) are measured at 25° C in o-chlorophenol.

| Ex. | Dye | Color of copolyester | Intrinsic viscosity | m.p. ° C |
|---|---|---|---|---|
| 7 | 2,9-dicarbethoxy | pink | 0.65 | 258 |

-continued

| Ex. | Dye | Color of copolyester | Intrinsic viscosity | m.p. °C |
|---|---|---|---|---|
| | quinacridone | | | |
| 8 | 6-hydroxy 4,11-dicarbethoxy quinacridone | blue-violet | 0.52 | 250 |
| 9 | 6-hydroxy 2,9-dichloro 4,11-dicarbethoxy quinacridone | violet | 0.49 | 248 |
| 10 | 2,6-dicarbethoxy-9,10-dichloro dioxazine | orange-yellow | 0.53 | 255 |
| 11 | bis-2,6(benzoylamino)-9,10-dichloro bis-3,7($\beta$-hydroxyethoxy) dioxazine | blue-violet | 0.52 | 254 |
| 12 | 9,10-dicarbethoxy-3,7-dimethoxy dioxazine | claret | 0.65 | 259 |
| 13 | 9,10-dicarbethoxy-2,6-dimethoxy dioxazine | red-violet | 0.59 | 257 |
| 14 | bis-2,6(benzoylamino)-9,10-dicarbethoxy-3,7-diethoxy-dioxazine | violet | 0.61 | 257 |

The 2,9-dicarbethoxy quinacridone employed in example 7 can be prepared as follows: A mixture of 25.6 parts of 2,5-dicarbethoxy cyclohexane 1,4-dione; 49.5 parts of ethyl p.amino benzoate; 0.5 parts of p.toluenesulfonic acid; and 50 parts by volume of Dowtherm A (eutectic mixture of biphenyl: 23.5% and of diphenyl oxide 76.5%) is heated for 6 hours at 95°–100° C in a nitrogen atmosphere. It is subsequently cooled to 85° C and 100 parts by volume of methanol are added. The precipitate is filtered and washed with methanol. A clear yellow powder is obtained which melts at 165° C and which is cyclized immediately in 6,13-dihydro 2,9-dicarbethoxy quinacridone by heating at 225°–256° C in 50 parts by volume of Dowtherm A in a nitrogen atmosphere. Clear yellow needles are formed. A suspension of 7.5 parts of 2,9-dicarbethoxy 6,13-dihydro quinacridone and of 9 parts of chloranile (2,3,5,6-tetrachloro 1,4-benzoquinone) is reflux-heated for 6 hours in 350 parts by volume of ethoxyethanol. It is then filtered at 90°–100° C. The product thus obtained is placed in warm ethoxy-ethanol, filtered again, and washed with dimethyl formamide and ethanol. After drying at 110° C, there is obtained the 2,9-dicarbethoxy quinacridone.

The 6-hydroxy 4,11-dicarbethoxy quinacridone utilized in example 8 can be prepared as follows: 8.2 parts of 2,5-dibromo 3,6-dicarbethoxy 1,4-benzoquinone and 8.3 parts of ethyl o-aminobenzoate are dissolved in a vehicle equipped with good agitation and a reflux column in 200 parts by volume of anhydrous methanol. The mixture is brought to reflux, about 2 parts of pyridine are added and the reflux is conducted for 90 minutes. The mixture is filtered under warm conditions and the precipitate is washed with methanol. The bis-2,5(2-carbethoxy phenylamino) 3,6-dicarbethoxy 1,4-benzoquinone thus obtained is subsequently cyclized in quinacridone-quinone by heating at 255°–256° C for 2 hours in 200 parts by volume of Dowtherm A. Thereafter 1 part of quinacridone-quinone thus obtained is dissolved at 60° C in 10 parts of 96% sulfuric acid. 1.5 parts of powdered copper are added and stirred for 2 hours while maintaining the temperature at 60° C. The mixture is filtered in order to eliminate the excess copper, water is added a little at a time to the filtrate until crystallization, and the blue paste thus obtained is filtered. The product is immersed in diluted sulfuric acid. The precipitate changes to light purple. It is then filtered and washed in water until the neutralization point and then washed in ethanol. The 4,11-dicarbethoxy 6-hydroxy quinacridone thus obtained is dried at 110° C.

By replacing the ethyl o-aminobenzoate with ethyl 2-amino 5-chloro benzoate, there is obtained in the same way 6-hydroxy 2,9-dichloro 4,11-dicarbethoxy quinacridone which was employed in example 9.

This bis-2,6(benzoylamino) 9,10-dichloro bis-3,7($\beta$-hydroxyethoxy) dioxazine employed in example 11 can be prepared by the following method: 10 parts of 2-($\beta$-hydroxyethoxy) 5-ethoxy aniline are dissolved in 100 parts of tepid water. 4 parts of sodium carbonate are added, then heated to 80°–85° C and subsequently 7.5 parts of benzoyl chloride are introduced during 45 minutes by vigorous stirring, while maintaining the temperature at 80°–85° C. The 1-benzoylamino 2-($\beta$-hydroxyethoxy) 5-ethoxy benzene will precipitate by cooling at 45°–50° C. The precipitate is filtered, washed in tepid water, recrystallized in ethanol and dried. 10 parts of the preceding product are dissolved in 70 parts of glacial acetic acid at 40° C, then cooled to 15° C and 3 parts by volume of nitric acid at 70% are introduced during 45 minutes, while maintaining the temperature at about 15° C. A yellow precipitate is obtained which is filtered and washed in water. 11 parts of 1-benzoylamino 2-($\beta$-hydroxyethoxy) 4-nitro 5-ethoxy benzene thus obtained above are dissolved in a mixture of 25 parts of water and 50 parts of acetic acid at 85° C. Thereafter 17 parts of iron powder are introduced during an hours time, while maintaining the temperature at about 85° C. There follows acidification by the addition of 50 parts of hydrochloric acid 12N. Then, the mixture is maintained at 85° C until complete formation of a white precipitate of chlorohydrate, thereafter the mixture is poured in 500 parts of boiling water; the chlorohydrate is solubilized. It is then filtered at 100° C to eliminate the iron sediment, washed with 100 parts of boiling water and the filtrate is cooled at 25°–30° C. The chlorohydrate crystallizes slowly. It is filtered, washed with cold water, and then placed in a solution of sodium carbonate at 20° C to separate the 2-ethoxy 4-benzoylamino 5-($\beta$-hydroethoxy) aniline.

94.8 parts of 4-benzoylamino 2-ethoxy 5-($\beta$-hydroxyethoxy)aniline are dissolved in a vehicle equipped with a vigorous agitation system in ambient temperature in 300 parts by volume of dimethylformamide. 24.6 parts of chloroanile are added by vigorous agitation, stirred for 3 hours at ambient temperature, and then 300 parts by volume of ethanol are added. The precipitate is filtered, washed in ethanol and dried. The solution of 10 parts of the product thus obtained, 10 parts of benzoyl chloride and 200 parts of o-dichlorobenzene are reflux-heated under agitation for 3 hours. The precipitate is filtered, washed in ethanol and the 9,10-dichloro bis-2,6(benzoylamino) bis-3,7($\beta$-hydroxyethoxy) dioxazine thus obtained is dried at 110° C.

The 9,10-dicarbethoxy 3,7-dimethoxy dioxazine employed in example 12 can be prepared in the following manner: 8.2 parts of 2,5-dibromo 3,6-dicarbethoxy 1,4-benzoquinone and 7.7 parts of 2,5-dimethoxy aniline are dissolved in a vehicle comprising a reflux column under vigorous agitation in 200 parts by volume of anhydrous methanol. The mixture is brought to reflux, about 2 parts of pyridine are added and the mixture is refluxed for an hour. The brownish-red precipitate thus obtained is filtered, washed with methanol and dried. The bis-2,5,(2,5,dimethoxy phenyl-amino) 3,6-dicarbethoxy 1,4-benzoquinone thus obtained is then cyclized in 9,10-dicarbethoxy 3,7-dimethoxy dioxazine by heating at reflux in o-dichlorobenzene in the presence of benzoyl chloride.

By replacing the 2,5-dimethoxy aniline with 2,4-dimethoxy aniline there is obtained the 9,10-dicarbethoxy 2,6-dimethoxy dioxazine employed in example 13.

EXAMPLE 15

A mixture of 200 parts of adipic acid, 100 parts of ethylene glycol, 0.1 parts of cadmium acetate and 0.1 parts of antimony trioxide is heated under a current of nitrogen. The water liberated by the esterification reaction is distilled off as it is produced. At the end of an hour the reaction temperature rises to 200° C: 12 parts of N-(β-hydroxyethyl) 4-(β-hydroxyethylamino) 1,8-naphthalimide is then added and the temperature is kept at 200° C for 3 hours while the pressure is reduced progressively to 0.05 mm Hg. In this way a copolyester is obtained with a very bright green-yellow color, strongly fluorescent. Its intrinsic viscosity, measured at 25° C in chloroform is 0.35 100 cm$^3$g$^{-1}$.

EXAMPLE 16

The process is carried out as in example 15, but using 24 parts of dyestuff instead of 12 parts. A yellow-brown copolyester is obtained with a high concentration of dyestuff. It can be used for bulk coloring of plastics materials and synthetic fibers. Its intrinsic viscosity measured at 25° C in chloroform is 0.25 100 cm$^3$g$^{-1}$.

EXAMPLE 17

The process is carried out as in example 15, kbut with replacement of the N-(β-hydroxyethyl) 4-(β-hydroxyethylamino) 1,8-naphthalimide by the same amount of N-(β-hydroxyethyl) 4-(β-hydroxyethoxy) 1,8-naphthalimide (optical whitening agent). A strongly fluorescent white copolyester is obtained (blue fluorescence under uv lamp), which can be used as a blueing agent in bulk coloring.

EXAMPLE 18

The process is carried out as in example 1, but with replacement of half of the N-(β-hydroxyethyl) 4-(β-hydroxyethylamino) 1,8-naphthalimide by 0.25 parts of the dye of formula XV. A canary yellow copolyester is obtained which melts at 252° C and has an intrinsic viscosity, measured as in example 1 of 0.55 100 cm$^3$g$^{-1}$.

EXAMPLE 19

The process is carried out as in example 1, but with replacement of the N-(β-hydroxyethyl) 4-(β-hydroxyethylamino) 1,8-naphthalimide by a mixture of 0.25 parts of 2,6-dicarbethoxy 9,10-dichloro dioxazine and 0.25 parts of bis-2,6(benzoylamino) 9,10-dichloro bis-3,7(β-hydroxyethoxy) dioxazine. A mauve copolyester is obtained which melts at 255° C and has an intrinsic viscosity measured as in example 1 of 0.53 100 cm$^3$g$^{-1}$.

EXAMPLE 20

The process is carried out as in example 1, but with replacement of 1/5 of the quantity of N-(β-hydroxyethyl) 4-(βhydroxyethylamino) 1,8-naphthalimide by 0.1 parts of 4,11-dicarbethoxy 6-hydroxy quinacridone. A copolyester is obtained with a green color melting at 249° C and with an intrinsic viscosity, measured as in example 1 of 0.50 100 cm$^3$g$^{-1}$.

I claim:

1. A dyed copolyester wherein the macromolecular chain of the copolyester comprises a unit selected from those of the formulae:

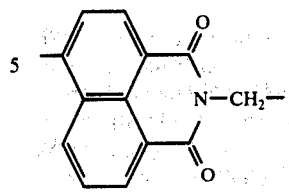

(II)

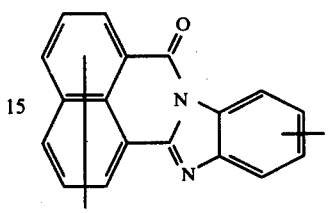

(III)

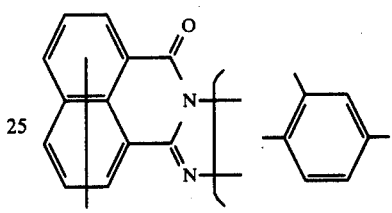

(IV)

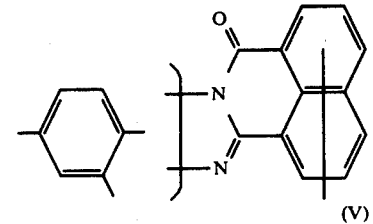

(V)

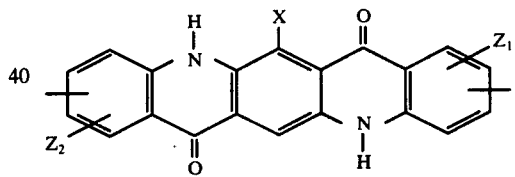

(VI)

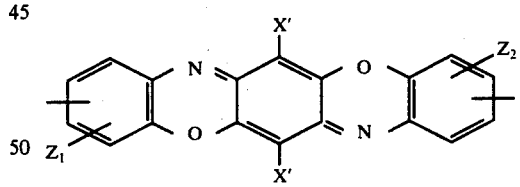

(VII)

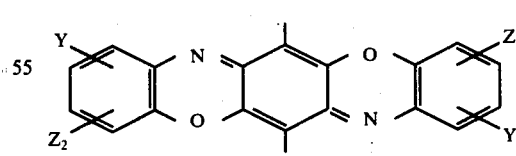

where X is hydrogen or hydroxy, X' is halogen, Y is alkoxy, $Z_1$ is hydrogen, halogen, alkyl or alkoxy and $Z_2$ is hydrogen or acylamino.

2. A process for the preparation of a copolyester according to claim 1, which comprises copolymerizing a dicarboxylic acid or an oxyacid and a diol with one or more dyestuffs possessing the reactive groups hydroxy, carboxy or carbalkoxy, wherein the dyestuff has the general formula

 (1)

where $R_1$ and $R_2$ may be the same or different and each represents a hydroxy, carboxy or carbalkoxy group, $W_1$ and $W_2$ may be the same or different and each represents a direct bond or a hydrocarbon chain which can carry an atom of oxygen, sulphur or nitrogen, and A represents a dyestuff moiety selected from those represented by the formula (II), (III), (IV), (V), (VI) and (VII) of claim 1.

3. A process for dyeing synthetic fibers and polymers comprising admixing with a polymer a sufficient amount of the copolyester as defined in claim 1.

4. A synthetic polymer fiber formed of the copolyester according to claim 1.